United States Patent
Shao et al.

(10) Patent No.: US 12,481,934 B2
(45) Date of Patent: Nov. 25, 2025

(54) METHOD AND SYSTEM FOR DETERMINING PRESSURE REGULATION SCHEME AT INTELLIGENT GAS GATE STATION BASED ON INTERNET OF THINGS

(71) Applicant: CHENGDU QINCHUAN IOT TECHNOLOGY CO., LTD., Sichuan (CN)

(72) Inventors: Zehua Shao, Chengdu (CN); Yuefei Wu, Chengdu (CN); Junyan Zhou, Chengdu (CN); Yaqiang Quan, Chengdu (CN); Xiaojun Wei, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 150 days.

(21) Appl. No.: 18/516,894

(22) Filed: Nov. 21, 2023

(65) Prior Publication Data
US 2024/0086788 A1   Mar. 14, 2024

Related U.S. Application Data

(63) Continuation of application No. 18/054,924, filed on Nov. 14, 2022, now Pat. No. 11,893,518.

(30) Foreign Application Priority Data

Oct. 20, 2022   (CN) .......................... 202211283386.2

(51) Int. Cl.
  *G06Q 10/04*   (2023.01)
  *G16Y 10/35*   (2020.01)
  (Continued)

(52) U.S. Cl.
  CPC .............. *G06Q 10/04* (2013.01); *G16Y 10/35* (2020.01); *G16Y 20/30* (2020.01); *G16Y 40/35* (2020.01)

(58) Field of Classification Search
  CPC ........ G16Y 20/30; G16Y 10/35; G16Y 40/35; G06Q 10/04
  (Continued)

(56) References Cited

U.S. PATENT DOCUMENTS

| | | |
|---|---|---|
| 2017/0124466 A1 | 5/2017 | Li et al. |
| 2020/0257971 A1 | 8/2020 | Yang et al. |
| 2022/0286761 A1 | 9/2022 | Shao et al. |

FOREIGN PATENT DOCUMENTS

| | | |
|---|---|---|
| CN | 105678997 | 6/2016 |
| CN | 109210388 | 1/2019 |

(Continued)

OTHER PUBLICATIONS

D.O. Hebb, The Organization of Behavior, McGill University, 1949, 365 pages.

(Continued)

*Primary Examiner* — Igor N Borissov
(74) *Attorney, Agent, or Firm* — METIS IP LLC

(57) ABSTRACT

A method and system of determining a pressure regulation scheme at an intelligent gas gate station based on an Internet of Things are provided. The method is performed by at least one processor of an intelligent gas management platform, and the intelligent gas management platform includes an intelligent customer service management sub-platform, an intelligent operation management sub-platform, and an intelligent gas data center. The method includes: obtaining, by a processor of the intelligent gas data center, gas terminal information from an intelligent gas object platform through an intelligent gas sensor network platform; predicting, by a (Continued)

processor of the intelligent operation management sub-platform, a gas gate station flow by analyzing the gas terminal information based on a flow model; determining, by the processor of the intelligent operation management sub-platform, gas gate station pressure; obtaining a pressure sum; and determining the pressure regulation scheme based on the pressure sum and a total pressure threshold.

17 Claims, 5 Drawing Sheets

(51) Int. Cl.
*G16Y 20/30* (2020.01)
*G16Y 40/35* (2020.01)

(58) Field of Classification Search
USPC ............ 705/1.1, 7.11, 7.12, 7.22, 7.23, 7.38
See application file for complete search history.

(56) References Cited

FOREIGN PATENT DOCUMENTS

| | | |
|---|---|---|
| CN | 112884250 | 6/2021 |
| CN | 113074323 | 7/2021 |
| CN | 113090959 | 7/2021 |
| CN | 113723834 | 11/2021 |
| CN | 113757789 | 12/2021 |
| CN | 114400056 A | 4/2022 |
| CN | 114429236 A | 5/2022 |
| CN | 114693495 | 7/2022 |
| CN | 114943482 | 8/2022 |
| CN | 115169683 | 10/2022 |
| EP | 2871598 | 5/2015 |
| EP | 3699700 | 8/2020 |
| JP | H09259186 A | 10/1997 |
| JP | 2002081600 | 3/2002 |
| JP | 2009209523 | 9/2009 |
| RU | 2743669 | 2/2021 |
| WO | 2010008265 | 1/2010 |
| WO | 2013059971 | 5/2013 |
| WO | 2015035134 | 3/2015 |
| WO | 2020209951 | 10/2020 |
| WO | 2021055954 | 3/2021 |

OTHER PUBLICATIONS

Fu, Ren-Xuan et al., Discussion on the Smart Gas Integrated Management Platform, Mobile Communications, 2016, 12 pages.
First Office Action in Chinese Application No. 202211283386.2 mailed on Nov. 28, 2022, 14 pages.
Notification to Grant Patent Right for Invention in Chinese Application No. 202211283386.2 mailed on Dec. 18, 2022, 8 pages.
Shao, Zehua et al., Intelligent Gas Meter IOT System Design, Internet of Things Technology, 2021, 12 pages.
Shao, Zehua, Research on Intelligent Gas Meter Cloud Platform, Gas&Heat, 38(3): B30-B34, 2018.
Beijing 3D Power Control Technology Co., Ltd., Shanxi Compressed Natural Gas Yuncheng Branch Gas Production and Operation Management System, Automation Exposition, 2016, 13 pages.
Gao, Shunli et al., Architecture and Optimization Direction of Operation and Scheduling of IntelligentCity Gas Network, Gas &Heat, 33(3): B33-B36, 2013.

400

```
┌─────────────────────────────────────┐  410
│  Obtaining the historical usage data of │ ╱
│  the gas terminal, and determining, based│
│  on the historical usage data of the gas │
│  terminal, the active status of the gas  │
│              terminal                │
└─────────────────────────────────────┘
                    │
                    ▼
┌─────────────────────────────────────┐  420
│  Adjusting, based on the active status, the │ ╱
│     gas terminal distribution feature    │
└─────────────────────────────────────┘
```

FIG. 4

METHOD AND SYSTEM FOR DETERMINING PRESSURE REGULATION SCHEME AT INTELLIGENT GAS GATE STATION BASED ON INTERNET OF THINGS

CROSS-REFERENCE TO RELATED APPLICATIONS

This application is a continuation of U.S. application Ser. No. 18/054,924, filed on Nov. 14, 2022, which claims priority to Chinese Patent Application No. 202211283386.2, filed on Oct. 20, 2022, the entire contents of which are incorporated herein by reference.

TECHNICAL FIELD

The present disclosure relates to field of gas transmission, and in particular to a method and a system for determining pressure regulation scheme at an intelligent gas gate station based on the Internet of Things.

BACKGROUND

In a gas pipe network, the fluctuations in downstream gas consumption can affect the gas distribution at an upstream gas gate station. To ensure the stability of downstream gas consumption, the relevant person or system usually regulates the pressure in the gas pipe network. However, there may be a delayed situation in pressure regulation. For example, when a gas gate station receives relevant feedback and regulates the pressure, it may take some time for the gas at the customer's gas device (e.g., gas stove) to be normal. In addition, inaccurate pressure regulation can cause greater fluctuations in gas pressure.

Therefore, it is desirable to provide a method and a system for determining pressure regulation scheme at an intelligent gas gate station based on the Internet of Things, which can realize the accurate, timely, and efficient intelligent regulation of the gas pressure.

SUMMARY

According to one or more embodiments of the present disclosure, a method for determining a pressure regulation scheme at an intelligent gas gate station based on an Internet of Things is provided. The method is performed by at least one processor of an intelligent gas management platform, and the intelligent gas management platform comprises an intelligent customer service management sub-platform, an intelligent operation management sub-platform, and an intelligent gas data center. The method comprising: obtaining, by a processor of the intelligent gas data center, gas terminal information from an intelligent gas object platform through an intelligent gas sensor network platform, wherein the gas terminal information includes gas terminal flow and a gas terminal distribution feature; predicting, by a processor of the intelligent operation management sub-platform, a gas gate station flow by analyzing the gas terminal flow and the gas terminal distribution feature based on a flow model, wherein the flow model is a machine learning model, and the flow model includes a first embedding layer, a second embedding layer, and a first output layer, wherein an output of the first embedding layer and an output of the second embedding layer are input to the first output layer, an input of the first embedding layer includes gas terminal flow at a plurality of time points, and the output of the first embedding layer includes a flow feature vector; an input of the second embedding layer includes the gas terminal distribution feature, and the output of the second embedding layer includes a distribution feature vector; and an input of the first output layer includes the flow feature vector and the distribution feature vector, and an output of the first output layer includes the gas gate station flow; wherein the flow model is obtained through jointly training the first embedding layer, the second embedding layer, and the first output layer based on a plurality of first training samples and first labels, wherein the first training samples include sample gas terminal flow and sample gas terminal distribution features, and the first labels include a sample gas gate station flow; wherein the jointly training includes: inputting the sample gas terminal flow into an initial first embedding layer to obtain an initial flow feature vector output by the initial first embedding layer; inputting the sample gas terminal distribution features into an initial second embedding layer to obtain an initial distribution feature vector output by the initial second embedding layer; inputting the initial flow feature vector and the initial distribution feature vector into an initial first output layer to obtain an initial gas gate station flow output by the initial first output layer; updating the initial first embedding layer, the initial second embedding layer, and the initial first output layer simultaneously by constructing a loss function based on the sample gas gate station flow and the initial gas gate station flow; and obtaining a trained first embedding layer, a trained second embedding layer, and a trained first output layer by updating parameters of the initial first embedding layer, the initial second embedding layer, and the initial first output layer; determining, by the processor of the intelligent operation management sub-platform, gas gate station pressure of each gas gate station based the gas gate station flow, gas gate station feature and gas terminal target pressure; obtaining a pressure sum by aggregating gas gate station pressures of gas gate stations; and determining the pressure regulation scheme of each gas gate station based on the pressure sum and a total pressure threshold, wherein the pressure regulation scheme is a scheme for regulating a gas pressure.

According to one or more embodiments of the present disclosure, a system for determining a pressure regulation scheme at the intelligent gas gate station based on the Internet of Things is provided. The system comprises an intelligent gas user platform, an intelligent gas service platform, an intelligent gas management platform, an intelligent gas sensor network platform, and an intelligent gas object platform, and the intelligent gas management platform includes an intelligent customer service management sub-platform, an intelligent operation management sub-platform, and an intelligent gas data center. The system further comprises a non-transitory computer-readable storage medium storing executable instructions and at least one processor in communication with the non-transitory computer-readable storage medium, wherein when executing executable instructions, the at least one processor is configured to cause the system to: obtain gas terminal information from the intelligent gas object platform through the intelligent gas sensor network platform, wherein the gas terminal information includes gas terminal flow and a gas terminal distribution feature; predict a gas gate station flow by analyzing the gas terminal flow and the gas terminal distribution feature based on a flow model, wherein the flow model is a machine learning model, and the flow model includes a first embedding layer, a second embedding layer, and a first output layer, wherein an output of the first embedding layer and an output of the second embedding layer are input to the first output layer, an input of the first embedding layer includes gas terminal flow at a plurality of time points, and the output of the first embedding layer includes a flow feature vector; an input of the second embedding layer includes the gas terminal distribution feature, and the output of the second embedding layer includes a distribution feature vector; and an input of the first output layer includes the flow feature vector and the distribution feature vector, and an output of the first output layer includes the gas gate station flow; wherein the flow model is obtained through jointly training the first embedding layer, the second embedding layer, and the first output layer based on a plurality of first training samples and first labels, wherein the first training samples include sample gas terminal flow and sample gas terminal distribution features, and the first labels include a sample gas gate station flow; wherein the jointly training includes: inputting the sample gas terminal flow into an initial first embedding layer to obtain an initial flow feature vector output by the initial first embedding layer; inputting the sample gas terminal distribution features into an initial second embedding layer to obtain an initial distribution feature vector output by the initial second embedding layer; inputting the initial flow feature vector and the initial distribution feature vector into an initial first output layer to obtain an initial gas gate station flow output by the initial first output layer; updating the initial first embedding layer, the initial second embedding layer, and the initial first output layer simultaneously by constructing a loss function based on the sample gas gate station flow and the initial gas gate station flow; and obtaining a trained first embedding layer, a trained second embedding layer, and a trained first output layer by updating parameters of the initial first embedding layer, the initial second embedding layer, and the initial first output layer; determine gas gate station pressure of each gas gate station based the gas gate station flow, gas gate station feature and gas terminal target pressure, obtaining a pressure sum by aggregating gas gate station pressures of gas gate stations, and determining the pressure regulation scheme of each gas gate station based on the pressure sum and a total pressure threshold, wherein the pressure regulation scheme is a scheme for regulating a gas pressure.

According to one or more embodiments of the present disclosure, a non-transitory computer-readable storage medium is provided, the storage medium stores the computer the instruction, and when the computer instruction is executed by a computer, the computer executes any one of the above method of determining the pressure regulation scheme at an intelligent gas gate station based on an Internet of Things.

BRIEF DESCRIPTION OF THE DRAWINGS

The present disclosure will be further described in the form of exemplary embodiments, which will be described in detail by the accompanying drawings. These embodiments are not limiting, in these embodiments, the same number denotes the same structure, wherein:

FIG. 4 is an exemplary flowchart of adjusting the gas terminal distribution feature according to some embodiments of the present disclosure;

DETAILED DESCRIPTION

Figure 1:
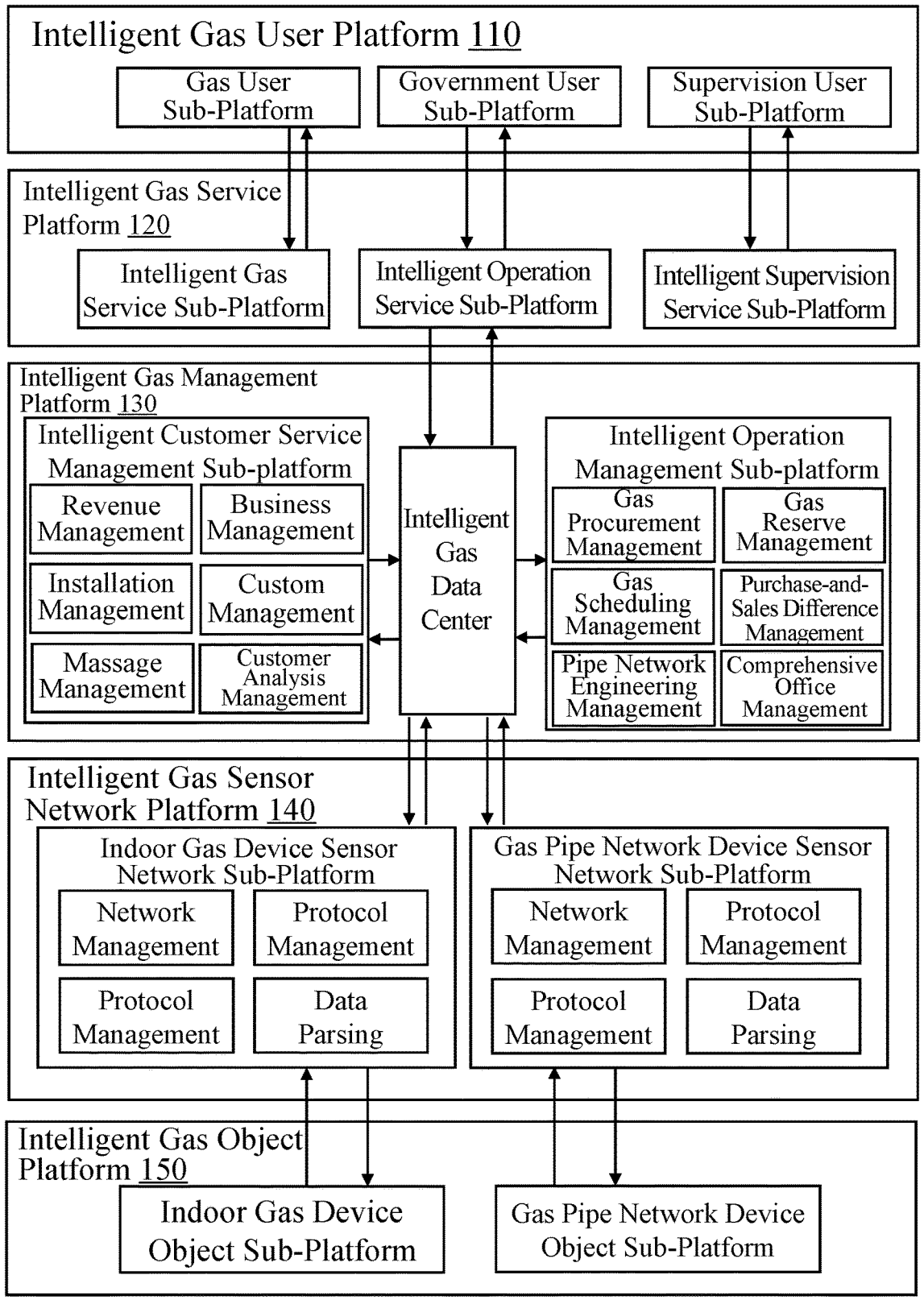
FIG. 1 is a schematic diagram illustrating a system of optimizing the pressure regulation at the intelligent gas gate station based on the Internet of Things according to some embodiments of the present disclosure.

To more clearly illustrate the technical solutions related to the embodiments of the present disclosure, a brief introduction of the drawings referred to the description of the embodiments is provided below. Obviously, the accompanying drawing in the following description is merely some examples or embodiments of the present disclosure, for those skilled in the art, the present disclosure may further be applied in other similar situations according to the drawings without any creative effort. Unless obviously obtained from the context or the context illustrates otherwise, the same numeral in the drawings refers to the same structure or operation.

It will be understood that the term "system," "device," "unit," and/or "module" used herein are one method to distinguish different components, elements, parts, sections, or assemblies of different levels in ascending order. However, if other words may achieve the same purpose, the words may be replaced by other expressions.

As used in the disclosure and the appended claims, the singular forms "a," "an," and "the" include plural referents unless the descriptions clearly dictate otherwise. Generally speaking, the terms "comprise" and "include" only imply that the clearly identified steps and elements are included, and these steps and elements may not constitute an exclusive list, and the method or system may further include other steps or elements.

Flowcharts are used throughout the present disclosure to illustrate the operations performed by the system according to embodiments of the present disclosure. It should be understood that the preceding or following operations are not necessarily performed in precise order. Instead, the individual steps may be processed in reverse order or simultaneously. It is also possible to add other operations to these processes or to remove a step or steps of operations from these processes.

FIG. 1 is a schematic diagram illustrating a system of optimizing the pressure regulation at the intelligent gas gate station based on the Internet of Things according to some embodiments of the present disclosure.

It should be understood that a system 100 of optimizing the pressure regulation at the intelligent gas gate station based on the Internet of Things may be implemented by using a plurality of methods. As shown in FIG. 1, the system 100 of optimizing the pressure regulation at the intelligent gas gate station based on the Internet of Things includes an intelligent gas user platform 110, an intelligent gas service platform 120, an intelligent gas management platform 130, an intelligent gas sensor network platform 140, and an intelligent gas object platform 150. In some embodiments, the system 100 of optimizing the pressure regulation at the intelligent gas gate station based on the Internet of Things may be a part of a processing device or realized by the processing device.

A gas gate station is a receiving station where natural gas enters a city pipe network from a long-distance pipeline and is part of the gas pipe network device. The gas gate station, which usually has the functions of detection, filtering, metering, pressure regulation, heat tracing, odorization, distribution, and remote telemetry/remote control, receives the high-pressure gas transmitted from the gas pipe network, performs the above processes on the high-pressure gas and then transmits the high-pressure gas to the city's central pipe network. The user may perform pressure regulation or storage management by remotely controlling the gate station device. Pressure regulation is a critical process, as the pressure of the gas may affect the speed of transmission, thereby affecting the amount of gas transmitted per unit of time. The intensity of pressure regulation differs for different types of users with different amount of gas. Therefore, optimizing the pressure regulation of gas transmission according to the type of customer, the distribution of the gas terminals, the gas usage situation, and the like, is beneficial to solve the problem of gas scheduling and gas control.

The intelligent gas user platform 110 may refer to a platform driven by the user. Specifically, the intelligent gas user platform 110 may be configured as a terminal device. The intelligent gas user platform 110 may obtain an input instruction (e.g., a gas operation and management information inquiry instruction) from the user, transmit the input instruction to an intelligent gas service sub-platform, and receive the relevant information (e.g., operation and management information of the gas gate station) uploaded by the intelligent gas service platform 120.

In some embodiments, the intelligent gas user platform 110 may include a gas user sub-platform, a government user sub-platform, and a supervision user sub-platform. The gas user sub-platform may be used for the user who uses gas. For example, the gas user sub-platform may obtain the input instruction from a gas user to interact with the intelligent gas service platform 120, and provide service information such as the amount of gas, gas costs, and safety rules for gas usage. The gas government sub-platform may be used for a government user. For example, the gas government user sub-platform may obtain the input instruction from the government user, interact with the intelligent gas service platform 120, and provide operation information such as gas scheduling, gas storage, etc. The gas supervision user sub-platform may be used for supervision user, for example, relevant persons and/or departments concerned with ensuring gas safety. For example, the gas supervision user sub-platform may obtain the input instruction from the supervision user to interact with the intelligent gas service platform 120, and provide safety supervision information such as a pipe network device situation, gas pressure, etc.

The intelligent gas service platform 120 may refer to a platform that may provide input and output services to the user. Specifically, the intelligent gas service platform 120 may receive commands (e.g., gas operation and management information query instruction) from the intelligent gas user platform 110 and process it, send the instruction to the intelligent gas management platform 130, and obtain information required by the user (e.g., operation and management information of a gas gate station) from the intelligent gas management platform 130 and send it to the intelligent gas user platform 110.

In some embodiments, the intelligent gas user platform 110 may include an intelligent gas service sub-platform, an intelligent operation service sub-platform, and an intelligent supervision service user sub-platform.

The intelligent gas service sub-platform can correspond to the gas user sub-platform. For example, the intelligent gas service sub-platform can transmit service information such as gas usage, gas costs, and safety rules to the gas user sub-platform.

The intelligent operation service sub-platform can interact with the government user sub-platform. For example, the intelligent operation service sub-platform can transfer operation information such as gas dispatching and gas storage and distribution to the government user sub-platform. The intelligent supervision service sub-platform may interact with the supervision user sub-platform. For example, the intelligent supervision service sub-platform may transmit safety supervision information, such as pipe network device condition and gas pressure, to the supervision user sub-platform.

The intelligent gas management platform 130 may be a platform that provide functions of perception management and control management for the system 100 of optimizing the pressure regulation at the intelligent gas gate station based on the Internet of Things. The intelligent gas management platform 130 may arrange and coordinate the connection and collaboration between a plurality of functional platforms that converge all of the information of the system 100 of optimizing the pressure regulation at the intelligent gas gate station based on the Internet of Things. In some embodiments, the intelligent gas management platform 130 may be a remote platform operated by a manager, artificial intelligence, or by pre-defined rules. Specifically, the intelligent gas management platform 130 may send the instruction to the intelligent gas sensor network platform 140 to obtain relevant data (e.g., indoor/pipe network gas device data) and receive relevant data uploaded by the intelligent gas sensor network platform 140. The intelligent gas management platform 130 may receive query instruction from the intelligent gas service platform 120 to obtain relevant data and upload the relevant data to the intelligent gas service platform 120.

In some embodiments, the intelligent gas management platform 130 may include an intelligent gas data center, an intelligent customer service management sub-platform, and an intelligent operation management sub-platform.

The intelligent gas data center may aggregate and store all operation data of the system 100 of optimizing the pressure regulation at the intelligent gas gate station based on the Internet of Things. The intelligent gas device management platform may interact with the intelligent gas service platform 120 and the intelligent gas sensor network platform 140 through the intelligent gas data center.

Both the intelligent customer service management sub-platform and the intelligent operation management sub-platform may be data usage platform that are independent to each other. The intelligent customer service management sub-platform and the intelligent operation management sub-platform may obtain relevant data from the intelligent gas data center and send management operation data to the intelligent gas data center. In some embodiments, the intelligent customer service management sub-platform may include a revenue management module, a business management module, an installation management module, a customer service management module, a message management module, and a customer analysis management module. In some embodiments, the intelligent operation management sub-platform may include a gas procurement management module, a gas reserve management module, a gas scheduling management module, a purchase-and-sales difference management module, a pipe network engineering management module, and a comprehensive office management module.

Exemplarily, the intelligent gas data center may receive the instruction from the intelligent gas service platform 120 to query the operation and management information of the gas gate station. The intelligent gas data center may issue the instruction to obtain data related to the gas device (e.g., gas usage of an indoor device) to the intelligent gas sensor network platform 140. The intelligent gas data center may receive related data of the gas device uploaded by the intelligent gas sensor network platform 140. The intelligent gas data center sends the related data of the gas device to the intelligent gas management sub-platform for analysis and processing. The different types of information may be analyzed and processed by the modules of the above management sub-platform. For example, a gas reserve management module may analyze and process the reserve information of gas volume. The gas scheduling management module may analyze and process gas distribution and regulation information of different regions and different pipe network nodes. The intelligent gas management sub-platform sends the analyzed and processed data to the intelligent gas data center. The intelligent gas data center sends the aggregated and processed data (e.g., the pressure regulation scheme of the gate stations, the status of gas reserves, etc.) to the intelligent gas service platform 120.

The intelligent gas sensor network platform 140 may refer to a functional platform for managing sensing communication. In some embodiments, the intelligent gas sensor network platform 140 may connect the intelligent gas management platform 130 and the intelligent gas object platform 150 to realize the function of sensing communication regarding sensing information and control information of the system of optimizing the pressure regulation at the intelligent gas gate station based on the Internet of Things. Specifically, the intelligent gas sensor network platform 140 may be configured as a communication network and gateway. The intelligent gas sensor network platform 140 may receive relevant data (e.g., gas indoor and/or pipe network device data) uploaded by the object platform and issue the instruction to obtain the relevant data to the intelligent gas object platform 150. The intelligent gas sensor network platform 140 may receive the instruction to obtain the relevant data from the intelligent gas data center and upload the relevant data to the intelligent gas data center.

In some embodiments, the intelligent gas sensor network platform 140 may include a indoor gas device sensor network sub-platform and a gas pipe network device sensor network sub-platform. Both the indoor gas device sensor network sub-platform and the gas pipe network device sensor network sub-platform may realize one or more functions such as network management, protocol management, instruction management, and data parsing, etc.

The intelligent gas object platform 150 may refer to a functional platform for generating perception information. The intelligent gas object platform 150 may be configured with a plurality of types of gas devices. The gas devices may include indoor devices and pipe network devices. The indoor devices may include gas terminals of the gas user (e.g., a gas meter, etc.). The pipe network devices may include gas gate stations, sections of gas transmission pipelines, gas valve control devices, etc. The information that may be obtained by the intelligent gas object platform 150 includes, but is not limited to, gas usage information, indoor gas device information, and gas pipe network device information, and the collected information may be transmitted to the intelligent gas management platform 130.

In some embodiments, the intelligent gas object platform 150 may include a indoor gas device object sub-platform and a gas pipe network device object sub-platform. In some embodiments, the indoor gas device object sub-platform may correspond to an indoor gas device sensor network sub-platform. The indoor gas pipe network object sub-platform may correspond to a gas pipe network device sensor network sub-platform. Specifically, the indoor gas device sensor network sub-platform may transmit the corresponding gas terminal information obtained through the indoor gas device object sub-platform to the intelligent gas data center. The gas pipe network device sensor network sub-platform may transmit the corresponding gas terminal information obtained through the gas pipe network device object sub-platform to the intelligent gas data center.

In some embodiments, the system 100 of optimizing the pressure regulation at the intelligent gas gate station based on the Internet of Things may be applied to a plurality of scenarios for gas operation management. In some embodiments, the system 100 of optimizing the pressure regulation at the intelligent gas gate station based on the Internet of Things may obtain relevant information (e.g., indoor gas device information, gas pipe network device information, etc.) for gas operation management in a plurality of scenarios to obtain the gas usage in each scenario. In some embodiments, the system 100 of optimizing the pressure regulation at the intelligent gas gate station based on the Internet of Things may obtain gas operation management scheme (e.g., the gas gate station pressure regulation scheme, the gas scheduling scheme, etc.) for each scenario based on the obtained gas usage in each scenario.

It is possible for those skilled in the art, after understanding the principle of the system, to adapt the system to any other suitable scenario without departing from that principle.

Taking the system 100 of optimizing the pressure regulation at the intelligent gas gate station based on the Internet of Things applying to the scenario as the example, the following will describe the system in detail.

The intelligent gas data center may be configured to obtain gas terminal information from the intelligent gas object platform 150 through the intelligent gas sensor network platform 140, the gas terminal information may include the gas terminal flow and the gas terminal distribution feature. More descriptions of obtaining the gas terminal information may be found in FIG. 2 and its related descriptions.

The intelligent operation management sub-platform may be configured to predict the gas gate station flow based on gas terminal information. More descriptions of predicting the gas gate station flow may be found in FIG. 2 and its related descriptions.

The intelligent operation management sub-platform may be configured to determine the pressure regulation scheme of a gas gate station based on the gas gate station flow. More descriptions of determining the pressure regulation scheme of the gas gate station may be found in FIG. 2 and its related descriptions.

In some embodiments, the intelligent operation management sub-platform may be further configured to transmit the pressure regulation scheme of the gas gate station to the intelligent gas data center. The intelligent gas data center may be further configured to transmit the pressure regulation scheme of the gas gate station to the intelligent gas service platform 120. The intelligent gas service platform 120 may transmit the pressure regulation scheme of the gas gate station to the intelligent gas user platform 110.

In some embodiments, the intelligent operation management sub-platform may further be configured to predict the gas gate station flow based on a flow model, wherein the flow model is a machine learning model, the input of the model includes the gas terminal flow and the gas terminal distribution feature, and the output includes the gas gate station flow. In some embodiments, the flow model includes a first embedding layer, a second embedding layer, and a first output layer, and the output of the first embedding layer and the output of the second embedding layer are the input of the first output layer. More descriptions regarding the flow model, the first embedding layer, the second embedding layer, and the first output layer may be found in FIG. 3 and its related descriptions. In some embodiments, the intelligent operation management sub-platform may further be configured to obtain historical usage data of the gas terminal and determine active status of the gas terminal based on the historical usage data, and adjust the gas terminal distribution feature based on the active status. In some embodiments, the input of the second embedding layer may include the gas terminal distribution feature, and the output includes the gas terminal distribution feature vector. More descriptions regarding the active status of the gas terminal and the gas terminal distribution feature may be found in FIG. 4 and its related descriptions.

In some embodiments, the intelligent operation management sub-platform may further be configured to determine the gas gate station pressure based on the gas gate station feature, the target pressure of gas terminal, and the gas gate station flow through a pressure model, and the pressure model is a machine learning model. In some embodiments, the input of the pressure model may further include the gas terminal distribution feature. In some embodiments, the gas gate station feature may include a pressure regulation range of the gas gate station. More descriptions regarding the pressure model, the gas gate station feature, and the pressure adjustment range may be found in FIG. 5 and its related descriptions.

It should be noted that the above description of the system of optimizing the pressure regulation at the intelligent gas gate station based on the Internet of Things and its modules is for descriptive convenience only and does not limit the present disclosure to the scope of the cited embodiments. It is understood that for those skilled in the art, after understanding the principle of the system, it may be possible to make any combination of individual modules or form subsystems to connect with other modules without departing from this principle. For example, the intelligent gas management platform 130, the intelligent gas user platform 110, the intelligent gas service platform 120, the intelligent gas sensor network platform 140, and the intelligent gas object platform 150 disclosed in FIG. 1 may be different platforms in one system, or one platform may realize the functions of two or more of the above platforms.

Figure 2:
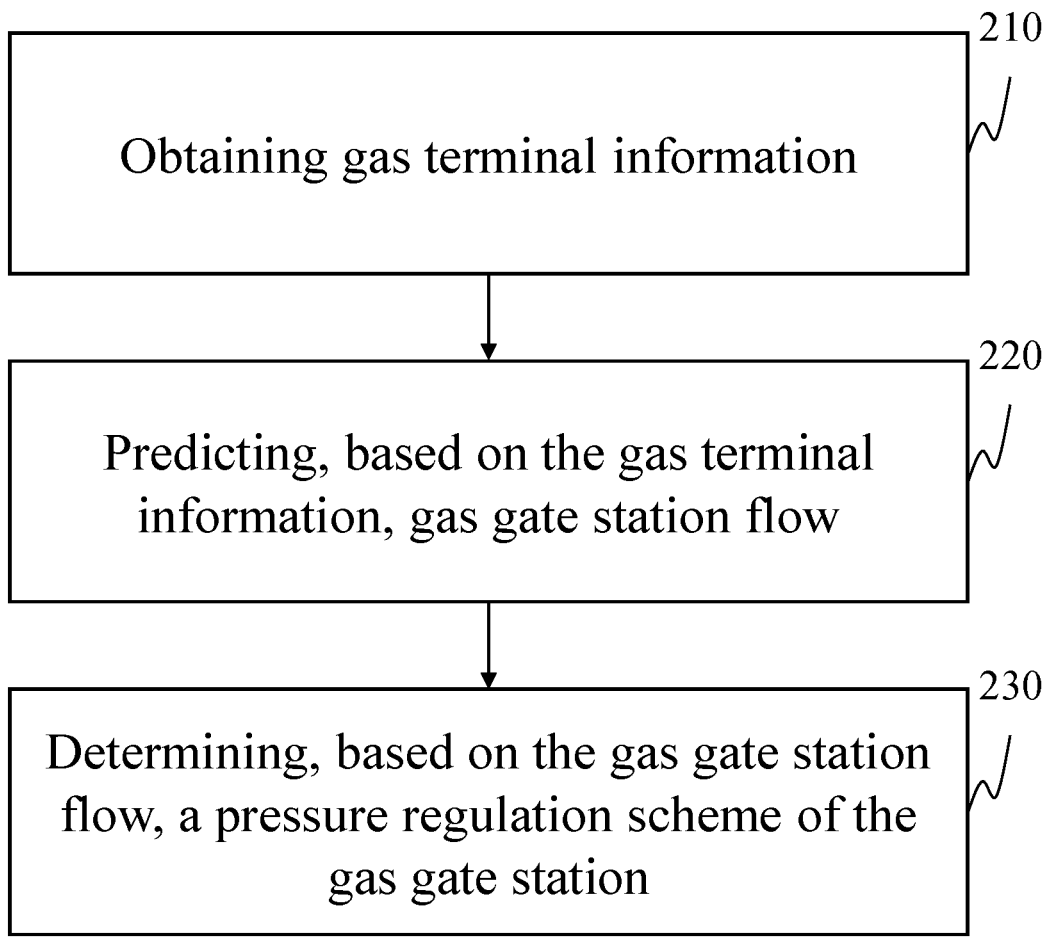
FIG. 2 is an exemplary flowchart illustrating a method of optimizing the pressure regulation at the intelligent gas gate station based on the Internet of Things according to some embodiments of the present disclosure.

FIG. 2 is an exemplary flowchart illustrating a method of optimizing the pressure regulation at the intelligent gas gate station based on the Internet of Things according to some embodiments of the present disclosure. In some embodiments, process 200 may be performed by a system of optimizing the pressure regulation at the intelligent gas gate station based on the Internet of Things. As shown in FIG. 2, process 200 includes the following steps.

Step 210, obtaining gas terminal information.

A gas terminal may refer to a terminal that monitors usage data of a gas device. In some embodiments, the gas terminal may include a gas meter (e.g., a membrane gas meter, an IC-card-intelligent gas meter, a remote gas meter, an Internet of Things gas meter, etc.), a flow meter (e.g., an orifice flow meter, a turbine flow meter, an ultrasonic flow meter, a girdle flow meter, a vortex flow meter, a rotary vortex flow meter). In some embodiments, exemplary gas devices may include industrial gas devices (e.g., industrial gas boilers, gas generators, etc.), gas devices for residential use (e.g., heating boilers, cookers, etc.), etc.

The gas terminal information refers to information relating to the gas terminal. The gas terminal information may include gas terminal flow and the gas terminal distribution feature.

The gas terminal flow is the amount of gas used by the gas device per unit of time as monitored by the gas terminal, e.g., 167 cubic meters of gas/hour, 3000 cubic meters of gas/month, 45 cubic meters of gas/day, etc. The gas terminal flow may be determined based on a usage time of the gas device and the amount of gas during the usage time. It should be understood that the gas terminal flow can fluctuate over a period of time (e.g., a day, a week, a year). For example, the gas terminal flow may be greater on a weekday than that on weekend. The gas terminal flow may also be greater at night after 18:00.

The gas terminal distribution feature may be used to reflect the user distribution situation of the gas terminals within a certain pipe network area. In some embodiments, the gas terminal distribution feature may include the current pipe network area, user type (e.g., residential type, commercial type, industrial type, etc.), a count of users, usage data, etc. In some embodiments, the gas terminal distribution feature may be represented by a vector. For example, vector (2, 30, 5888, 78, A, B, C) may represent that 30 users of pipeline 2 are industrial users, 5888 are residential users, and 78 are commercial users, element A may represent the gas usage data for the industrial users, element B may represent the gas usage data for the residential users, and element C may represent the gas usage data for the commercial users. In some embodiments, data such as user type, a count of users, etc., may be obtained based on third parties (e.g., demographic records, industrial and commercial databases, etc.).

In some embodiments, the system may obtain gas terminal information. For example, the system may obtain gas terminal information from data recorded by the gas terminal, data stored in the gas usage database, etc. In some embodiments, the system may determine whether a gas terminal is in active status. If the data recorded by the gas terminal has not changed over a period of time (e.g., 1 day, 3 weeks, etc.), the system can determine that the gas terminal is not being used and is not in the "active status". The system can also obtain gas terminal information by other means, which are not limited here.

In some embodiments, the intelligent gas data center may obtain gas terminal information from the intelligent gas object platform through the intelligent gas sensor network platform. Exemplarily, the intelligent gas data center may send the instruction to the intelligent gas sensor network platform for obtaining gas terminal information. The intelligent gas data center may receive the gas terminal information uploaded by the intelligent gas sensor network platform.

Step 220, predicting, based on the gas terminal information, gas gate station flow.

The gas gate station flow is the amount of gas used by a gas gate station per unit of time, e.g., 50,000 cubic meters of gas/month, 600 cubic meters of gas/day, etc. Similarly, to the gas terminal flow, the gas gate station flow may be determined based on the usage time of the gas gate station and the amount of gas during the usage time. More descriptions regarding the gas gate station may be found in FIG. 1 and its related descriptions.

In some embodiments, the system may perform modeling or employ a plurality of data analysis algorithms to analyze and process the gas terminal information to predict the gas gate station flow. By way of example only, the system may determine historical gas terminal information vectors corresponding to the historical gas terminal information based on the historical gas terminal information in advance, and generate a corresponding table of the gas gate station flow based on the historical actual gas station flow corresponding to each historical gas terminal information vector. Understandably, the system may determine the gas terminal information vector (also referred to as the vector of the gas terminal information) to be predicted corresponding to the current gas terminal information based on the current gas terminal information. Further, the system may determine at least one target gas terminal information vector among the historical gas terminal information vectors based on a vector distance (e.g., euclidean distance) between the gas terminal information vector to be predicted and the historical gas terminal information vectors. The system may use the gas gate station flow corresponding to at least one target gas terminal information vector as the current gas gate station flow.

In some embodiments, the system may predict the gas gate station flow based on a flow model, the flow model is a machine learning model, the inputs to the model include gas terminal flow and the gas terminal distribution feature, and the outputs include the gas gate station flow. More descriptions regarding the flow model may be found in FIG. 3 and its related descriptions.

In some embodiments, the intelligent operation management sub-platform may predict the gas gate station flow based on gas terminal information. Exemplarily, the intelligent gas data center may send gas terminal information to the intelligent gas management sub-platform, and the intelligent gas management sub-platform may analyze and process the gas terminal information to predict the gas gate station flow.

Step 230, determining, based on the gas gate station flow, a pressure regulation scheme of the gas gate station.

The pressure regulation scheme is a scheme for regulating gas pressure, which can include an adjustment time, an adjustment range, etc. For example, after 17:00, the gas pressure is increased by 20%, after 24:00 am, the gas pressure is reduced by 20%, etc. It should be understood that gas pressure can affect the rate of gas transmission, i.e., the amount of gas transmitted per unit of time. Based on the amount of gas used by different types of users, the gas pressure in areas with a large industrial users and commercial users is usually higher than the gas pressure in areas with residential users. Therefore, the system can determine the gas gate station flow based on gas terminal information (e.g., user gas terminal flow and the gas terminal distribution feature), further determine the regulation scheme of the gas gate station, and perform optimization of pressure regulation on gas transmission.

In some embodiments, the system may perform modeling or employ a plurality of data analysis algorithms to analyze and process the gas gate station flow to determine the pressure regulation scheme for the gas gate station. By way of example only, the system may generate a pressure regulation scheme of the gas gate station based on the pressure regulation scheme of the historical actual gas gate station corresponding to each historical gas gate station, in advance. Understandably, the system may determine the pressure regulation scheme of the gas gate station corresponding to the same or similar historical gas gate station flow as the pressure regulation scheme of the current gas gate station based on the current gas gate station flow.

In some embodiments, the system may determine the pressure of each of multiple gas gate stations through a pressure model based on a gas gate station feature, the target pressure of gas terminal, and the gas gate station flow, and then aggregate the pressure of the gas gate stations. The system may further determine a pressure regulation scheme for each gas gate station by making corrections to the aggregated pressure. In some implementations, corrections may further be made to the aggregated pressure based on manual work, for example, if the sum of the pressure of all the gas gate stations exceeds a specified total pressure threshold, some of the larger gas gate station pressure may be manually corrected as a smaller value. More descriptions regarding the pressure model may be found in FIG. 5 and its related descriptions.

In some embodiments, the intelligent operation management sub-platform may determine a pressure regulation scheme of the gas gate station based on the gas gate station flow. Exemplarily, the intelligent operation management sub-platform may analyze and process the gas gate station flow to determine a pressure regulation scheme for the gas gate station. The intelligent gas management sub-platform may send the pressure regulation scheme of the gas gate station to the intelligent gas data center.

The method described in some embodiments of the present disclosure determines the pressure regulation scheme of the gas gate station by analyzing the type of users, the distribution of users, and the gas consumption situation, thereby realizing accurate, timely, and efficient intelligent regulation of gas pressure, avoiding the fluctuation of the downstream gas from affecting the gas distribution of the upstream gas gate station, and ensuring the stable supply of gas.

Figure 3:
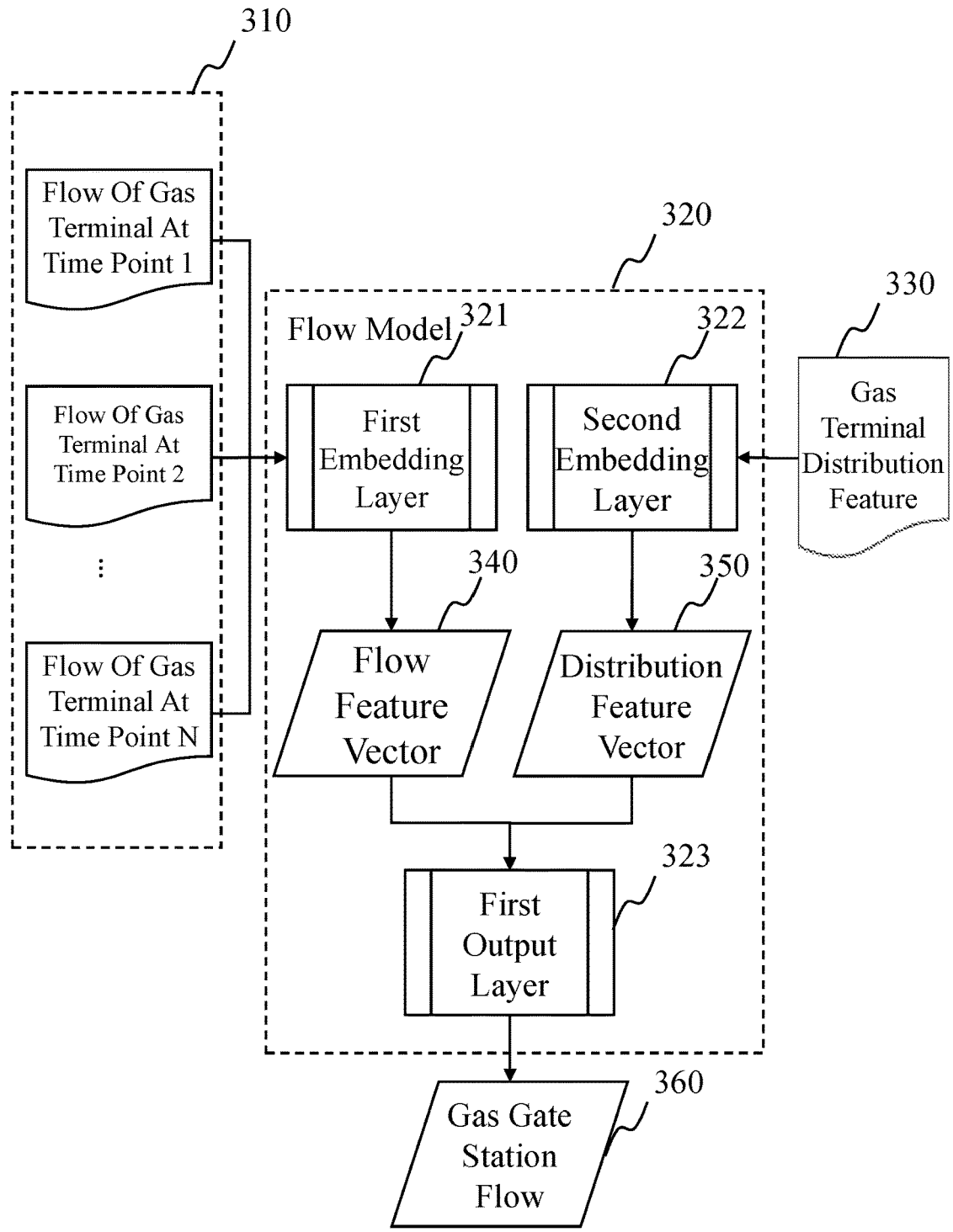
FIG. 3 is an exemplary schematic diagram illustrating a flow model according to some embodiments of the present disclosure.

FIG. 3 is an exemplary schematic diagram illustrating a flow model according to some embodiments of the present disclosure. As shown in FIG. 3, the structure 300 of the flow model includes at least the following elements.

In some embodiments, the gas terminal flow and the gas terminal distribution feature may be processed using a flow model to predict the gas gate station flow. The flow model may be a machine learning model, the inputs to the model include gas terminal flow and the gas terminal distribution feature, and the output is the gas gate station flow. More descriptions regarding the gas terminal flow, the gas terminal distribution feature, and the gas gate station flow may be found in the rest of the present disclosure (e.g., FIG. 2 and its related descriptions).

The flow model 320 may include a first embedding layer 321, a second embedding layer 322, and a first output layer 323. In some embodiments, the first embedding layer 321, the second embedding layer 322, and the first output layer 323 may be a convolutional neural network or a deep neural network, or a model obtained by a combination thereof.

In some embodiments, the input of the first embedding layer 321 may include gas terminal flow 310 at a plurality of time points, e.g., flow of gas terminal time at point 1, flow of gas terminal at time point 2, . . . , flow of gas terminal at time point n, etc., and the plurality of time points may be a count of time points determined according to the experience, and the output of the first embedding layer 321 may include a flow feature vector 340.

In some embodiments, the input of the second embedding layer 322 may include the gas terminal distribution feature 330, and its output may include a distribution feature vector 350. The input of the first output layer 323 may include flow feature vector 340, and the distribution feature vector 350, and its output may include gas gate station flow 360. In some embodiments, the input of the second embedding layer may also include an adjusted gas terminal distribution feature, and a description of the adjusted gas terminal distribution feature may be found in FIG. 4 and its related descriptions.

The flow feature vector 340 may refer to a vector that reflects the flow information of the gas terminal. For example, vector (2.2, 0.7) may indicate that the gas terminal uses a gas volume of 2.2 cubic meters and a usage time of 0.7 hours.

The distribution feature vector 350 may refer to a vector representing the gas terminal distribution feature. For example, the vector (2, 25, 1378) may indicate that there are 25 industrial gas terminals and 1378 residential gas terminals corresponding to gas pipeline number 2.

The gas gate station flow 360 may be the gas flow data output by the gas gate station for a future time period. For example, the gas gate station flow (1500, 800, 1700) may represent the gas flow of gas output per hour of the gas gate station in the next three hours being 1500 $m^3$, 800 $m^3$, and 1700 $m^3$.

In some embodiments, the output of the first embedding layer 321 and the second embedding layer 322 may be used as the input of the first output layer 323, and the first embedding layer 321, the second embedding layer 322, and the first output layer 323 may be obtained by joint training.

In some embodiments, the first embedding layer 321, the second embedding layer 322, and the first output layer 323 are jointly trained with sample data including sample gas terminal flow, sample gas terminal distribution features, and the labels are the sample gas gate station flow. A plurality of sample gas terminal flow are input into the first embedding layer 321 to obtain a flow feature vector output by the first embedding layer 321. The sample gas terminal distribution features are input into the second embedding layer 322 to obtain a distribution feature vector output by the second embedding layer 322. The flow feature vector and the distribution feature vector are input into the first output layer 323 as the training sample data to obtain the gas gate station flow output by the the first embedding layer 321. The second embedding layer 322 and the first output layer 323 are updated simultaneously by constructing a loss function based on the sample gas gate station flow and the gas gate station flow instruction output by the first output layer 323. By updating the parameters, the trained first embedding layer 321, the second embedding layer 322, and the first output layer 323 is obtained.

In some embodiments of the present disclosure, the flow model is trained with an extensive amount of gas terminal-related data, and the gas gate station flow is predicted based on the trained flow model. The prediction results are more realistic and have a high degree of accuracy. Furthermore, the use of the flow model may effectively improve prediction efficiency.

FIG. 4 is an exemplary flowchart of adjusting the gas terminal distribution feature according to some embodiments of the present disclosure. In some embodiments, the process may be performed by an intelligent gas management platform. As shown in FIG. 4, process 400 includes the following steps.

Step 410, obtaining the historical usage data of the gas terminal, and determining, based on the historical usage data of the gas terminal, the active status of the gas terminal.

The historical usage data may include a usage frequency and/or gas flow of the gas terminal in a past time period, etc. For example, (7, 0, 0, 30, 1, 0.3) may indicate that the gas terminal has been used 0 times in the past 7 days with a gas flow of 0, and 1 time in the past 30 days with a gas flow of 0.3 cubic meters.

Active status may refer to the extent to which the gas terminal has been used in the past time period. It is understood that when a gas terminal has not been used for a period of time, then the gas terminal is not in active status.

In some embodiments, the past time period, such as 3 days, 7 days, and/or 30 days, etc., may be preset based on the actual situation, and then the historical usage data of the gas terminal during the past time period is analyzed to determine the active status of the gas terminal. For example, if the count of uses and gas flow of a gas terminal in the past 7 days and the past 30 days are both 0, the gas terminal is not in active status. For example, if the count of uses and the gas flow of the gas terminal in the past 7 days are both 0, and the count of uses and the gas flow in the past 30 days are both lower than the threshold values, for example, a threshold of the count of uses may be 2 and the gas flow threshold may be 0.5 cubic meters, then the gas terminal is not in active status.

Step 420, adjusting, based on the active status, the gas terminal distribution feature.

In some embodiments, the gas terminal distribution feature may be adjusted based on the active status of the gas terminal by using a plurality of methods such as table building, statistical analysis, inductive analysis, and/or classification models. For example, a data table may be created based on the gas terminals and its corresponding active status, and then gas terminals in active status may be filtered out and thereby adjusting the gas terminal distribution feature. Exemplarily, for a gas terminal distribution feature (2, 30, 5888, 78, A, B, C), 25 industrial gas terminals are determined in active status, 5,500 residential gas terminals are determined in active status, and 70 commercial gas terminals are determined in active status based on the active status of gas terminals, and the gas terminal distribution feature may be adjusted as (2, 25, 5500, 70, A, B, C). Accordingly, it is also possible to adjust the amount of used gas corresponding to each type of gas terminal based on the active status of the gas terminal. More descriptions regarding the gas terminal distribution feature may be found in FIG. 2 and its related descriptions.

In some embodiments of the present disclosure, the active status of the gas terminal may be judged based on the historical usage data of the gas terminal, and the gas terminal distribution feature can be adjusted more accurately and reasonably, so that the adjusted gas terminal distribution feature is more accord with the actual situation, and thus the prediction result of the flow model can be more accurate.

It should be noted that the above description of process 400 is for example and illustration purposes only and does not limit the scope of application of the present disclosure. For those skilled in the art, a plurality of amendments and changes may be made to process 400 under the guidance of the present disclosure. However, these amendments and changes remain within the scope of the present disclosure.

Figure 5:
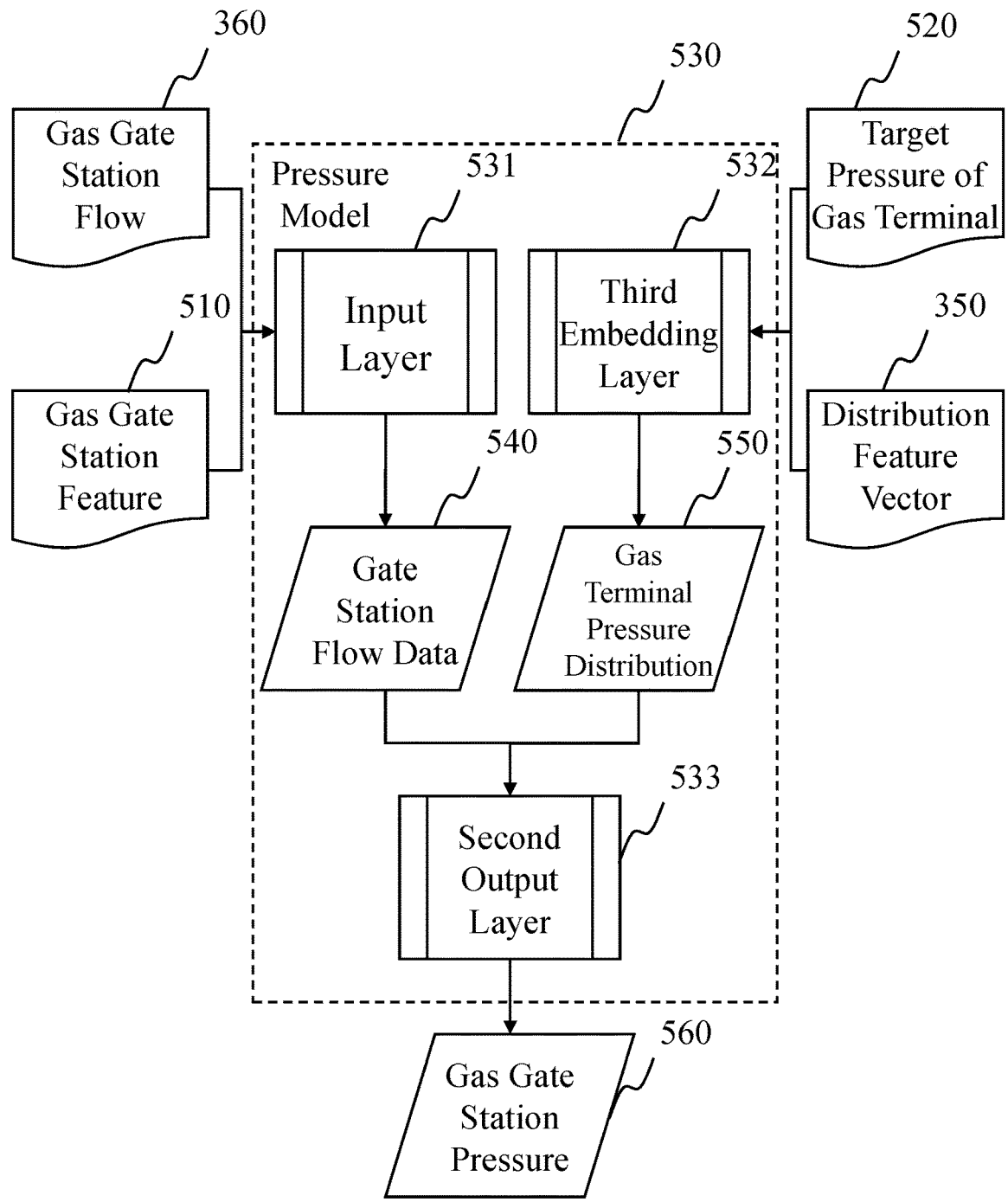
FIG. 5 is an schematic diagram illustrating an exemplary pressure model according to some embodiments of the present disclosure.

FIG. 5 is a schematic diagram illustrating an exemplary pressure model according to some embodiments of the present disclosure. As shown in FIG. 5, the structure 500 of the pressure model may include the following descriptions.

In some embodiments, a pressure model may be used to process gas gate station flow, gas gate station feature, and the target pressure of gas terminal to determine gas gate station pressure. The pressure model may be a machine learning model, for example, a convolutional neural network or a deep neural network, or a model obtained by a combination thereof, etc.

In some embodiments, the inputs to pressure model 530 may include gas gate station flow 360, gas gate station feature 510, and the target pressure of gas terminal 520. The output of the pressure model may be gas gate station pressure 560.

In some embodiments, the input of the pressure model 530 may also include the gas terminal distribution feature, for example, the distribution feature vector 350, where the distribution feature vector may be determined by the second embedding layer 322 of the flow model in FIG. 3.

The gas gate station feature may refer to the parameters related to gas transmission at the gas gate station. For example, the gas gate station feature may include the adjustment range of the gas pressure allowed by the gas gate station, e.g., 0.7 MPa to 2.8 MPa.

In some embodiments, the gas gate station feature may be determined based on attributes of the gas gate station. For example, the allowable gas pressure regulation range of the gas gate station may be determined based on the design pressure of related devices and pipes at the gas gate station.

The target pressure of gas terminal may refer to a preset gas pressure under normal operation of the gas terminal. In some embodiments, the target pressure of gas terminal may be a range of values. For example, the target pressure of gas terminal may be 2 kPa to 3 kPa greater than the standard atmospheric pressure.

In some embodiments, the target pressure of gas terminal may be determined by manual analysis or meter check according to the type of gas terminal.

The pressure of the gas gate station may refer to the gas pressure at a gas gate station when transmitting gas to a downstream gas pipeline. In particular, the pressure of the gas gate station may include the gas pressure of a plurality of gas transmission pipelines of a plurality of the gas gate stations. For example, the pressure of the gas gate station may be 2.8 MPa.

See FIG. 3 and its related descriptions for a more detailed description of the gas gate station flow and distribution feature vectors.

In some embodiments, the pressure model 530 may include an input layer 531, a third embedding layer 532, and a second output layer 533. The input layer 531, the third embedding layer 532, and the second output layer 533 may be a convolutional neural network or a deep neural network, or a model obtained by a combination thereof.

In some embodiments, the input of input layer 531 may include gas gate station flow 360 and gas gate station feature 510, and the output of which may include gate station flow data 540. The input of third embedding layer 532 may include the target pressure of gas terminal 520, and the output of which may include gas terminal pressure distribution 550. The input of second output layer 533 may include gate station flow data 540 and gas terminal pressure distribution 550, the output of which may include the gas gate station pressure 560. In some embodiments, the input of the third embedding layer 532 may also include the distribution feature vector 350.

The gate station flow data 540 may be used to reflect the gas flow and gas pressure regulation range of the gas output by the gas gate station in the future period. For example, the gate station flow data (1400, 1800, 1.3, 2.9) may indicate that the gas flow of the gas gate station is 1400 m$^3$ and 1800 m$^3$ per hour for the next two hours, and the gas pressure regulation range is 1.3 MPa to 2.9 MPa.

The gas terminal pressure distribution 550 may be data reflecting the target pressure of different gas terminals. For example, the gas terminal pressure distribution (20, 0.3, 0.4, 1700, 0.102, 0.103) may indicate that there are 20 gas terminals with a target pressure range of 0.3 MPa to 0.4 MPa and 1700 gas terminals with a target pressure range of 0.102 MPa to 0,103 MPa.

In some embodiments, the output of the input layer 531 and the third embedding layer 532 may be used as the input of the second output layer 533, and the input layer 531, the third embedding layer 532, and the second output layer 533 may be obtained by joint training.

In some embodiments, the sample data required for joint training by the input layer 531, third embedding layer 532, and second output layer 533 includes sample gas gate station flow, sample gas gate station feature, sample target pressure of gas terminal, and sample distribution feature vector labeled the sample gas gate station pressure. The sample gas gate station flow and the sample gas gate station feature are input into the input layer 531 to obtain the gate station flow data output from the input layer 531. The sample target pressure of gas terminal and the sample distribution feature vector are input into the third embedding layer 532 to obtain the gas terminal pressure distribution output from the third embedding layer 532. The gate station flow data and the gas terminal pressure distribution are input into the second output layer 533 as the training sample data to obtain the second output layer 533, and obtain the gas terminal pressure output from the second output layer 533. The loss function is constructed based on the the sample gas gate station pressure and the gas gate station pressure output from the second output layer 533. The input layer 531, the third embedding layer 532, and the second output layer 533 are updated simultaneously. By updating the parameters, the trained input layer 531, the third embedding layer 532, and the second output layer 533 are obtained.

In other embodiments, the output of the flow model 320 may be used as an input of the pressure model 530, and the flow model 320 and the pressure model 530 may be obtained by joint training.

In some embodiments, the sample data required for joint training of the flow model 320 and the pressure model 530 includes the sample gas terminal flow, the sample gas terminal distribution feature, the sample gas gate station feature, and the sample target pressure of gas terminal. The label is the sample gas gate station pressure. The sample gas terminal flow and the sample gas terminal distribution feature are input into the flow model 320 to obtain the gate station flow data output by the flow model 320, the gate station flow data is input into the pressure model 530 as the training sample data together with the sample gas gate station feature and the sample target pressure of gas terminal to obtain the pressure of the gas gate station output by the pressure model 530. Based on the the sample gas gate station pressure and the pressure of the gas gate station output from the pressure model 530, a loss function is constructed and the flow model 320 and the pressure model 530 are updated simultaneously. The trained flow model 320 and the trained pressure model 530 are obtained by updating the parameters. More descriptions regarding the flow model 320 may be found in FIG. 3 and its related descriptions.

In some embodiments of the present disclosure, by using a large and wide range of data related to gas gate stations and gas terminals as training samples and labels to train the pressure model, and by processing data such as the gas gate station flow and the gas terminal target pressure based on the trained pressure model, the pressure regulation data of the gas gate stations may be obtained quickly and accurately. In addition, by jointly training each layer of the pressure model and jointly training the flow model and the pressure model, the training cost can be reduced and the training efficiency can be improved.

One or more embodiments of the present disclosure provide a device of optimizing the pressure regulation at the intelligent gas gate station based on the Internet of Things comprising a processor, processor for executing any of the method of optimizing the pressure regulation at the intelligent gas gate station based on the Internet of Things as provided in embodiments of the present disclosure.

The embodiments of the present disclosure further provide a non-transitory computer-readable storage medium, the storage medium stores the computer the instruction, and when the computer instruction is executed by a computer, the computer executes any one of the above method of optimizing the pressure regulation at an intelligent gas gate station based on an Internet of Things.

The basic concepts have been described above, apparently, for those skilled in the art, the above-detailed disclosure is only an example, and does not constitute a limitation of the specification. Although it is not clearly stated here, technical personnel in the art may modify, improve, and amend the present disclosure. The amendments, improvements, and amendments are recommended in the present disclosure, so the amendments, improvements, and amendments still belong to the spirit and scope of the demonstration embodiments of the present disclosure.

At the same time, the present disclosure uses a specific word to describe the embodiments of the present disclosure. For example, "one embodiment", "an embodiment", and/or "some embodiments" means a feature, structure, or feature of at least one embodiment related to the present disclosure. Therefore, it should be emphasized and noted that in the present disclosure, "one embodiment" or "an embodiment" or "an alternative embodiment" that are mentioned in different positions in the present disclosure do not necessarily mean the same embodiment. In addition, some features, structures, or features of one or more embodiments in the present disclosure may be properly combined.

In addition, unless the claims are clearly stated, the order of the processing elements and sequences, the use of digital letters, or the use of other names described in this description are not used to limit the order and method of the present disclosure process and method. Although in the above disclosure, some examples are discussed through various examples that are currently considered useful, it should be understood that these types of details are only explained. The additional claims are not limited to the implementation examples of the disclosure. The requirements are required to cover all the amendments and equivalent combinations that meet the essence and scope of the implementation of the present disclosure. For example, although the implementation of various components described above may be embodied in a hardware device, it may also be implemented as a software-only solution, e.g., an installation on an existing server or mobile device.

In the same way, it should be noted that, to simplify the statement of the disclosure and help the understanding of one or more embodiments, in the descriptions of the embodiments of the present disclosure, sometimes multiple features will be attributed to one embodiment, figures, or its descriptions. However, this disclosure method does not mean that the feature required by the object of this description is more than the feature mentioned in the claims. Rather, claimed subject matter may lie in less than all features of a single foregoing disclosed embodiment.

Finally, it should be understood that the embodiments described in the present disclosure are only used to illustrate the principle of the embodiments of this description. Other deformation may also belong to the scope of the present disclosure. Therefore, as an example, rather than restrictions, the replacement configuration of the embodiment of the present disclosure may be consistent with the teaching of the present disclosure. Correspondingly, the embodiments of the present disclosure are not limited to the implementation and description of the present disclosure.

What is claimed is:

1. A method for determining a pressure regulation scheme at an intelligent gas gate station based on an Internet of Things, wherein the method is performed by an intelligent gas management platform, and the intelligent gas management platform comprises an intelligent customer service management sub-platform, an intelligent operation management sub-platform, and an intelligent gas data center, the method comprising:

obtaining, by an intelligent gas data center processor, gas terminal information and historical usage data from a gas terminal in an intelligent gas object platform through an intelligent gas sensor network platform, wherein the gas terminal information includes gas terminal flow and a gas terminal distribution feature, the gas terminal refers to a terminal that monitors usage data of a gas device, the gas terminal includes a gas meter and a flow meter, the gas device includes industrial gas devices and gas devices for residential use, and the industrial gas devices include industrial gas boilers and gas generators;

determining, by an intelligent operation management sub-platform processor, active status of the gas terminal based on the historical usage data, wherein the active status is an extent to which the gas terminal is used in a past time period corresponding to the historical usage data;

adjusting, by the intelligent operation management sub-platform processor, the gas terminal distribution feature based on the active status;

predicting, by the intelligent operation management sub-platform processor, a gas gate station flow by analyzing the gas terminal flow and an adjusted gas terminal distribution feature based on a flow model, wherein the flow model is a machine learning model, and the flow model includes a first embedding layer, a second embedding layer, and a first output layer, wherein an output of the first embedding layer and an output of the second embedding layer are input to the first output layer, an input of the first embedding layer includes gas terminal flow at a plurality of time points, and the output of the first embedding layer includes a flow feature vector; an input of the second embedding layer includes the adjusted gas terminal distribution feature, and the output of the second embedding layer includes a distribution feature vector; and an input of the first output layer includes the flow feature vector and the distribution feature vector, and an output of the first output layer includes the gas gate station flow;

wherein the flow model is obtained through jointly training the first embedding layer, the second embedding layer, and the first output layer based on a plurality of first training samples and first labels, wherein the first training samples include sample gas terminal flow and sample gas terminal distribution features, and the first labels include a sample gas gate station flow;

wherein the jointly training includes:

inputting the sample gas terminal flow into an initial first embedding layer to obtain an initial flow feature vector output by the initial first embedding layer;

inputting the sample gas terminal distribution features into an initial second embedding layer to obtain an initial distribution feature vector output by the initial second embedding layer;

inputting the initial flow feature vector and the initial distribution feature vector into an initial first output layer to obtain an initial gas gate station flow output by the initial first output layer;

updating the initial first embedding layer, the initial second embedding layer, and the initial first output layer simultaneously by constructing a loss function based on the sample gas gate station flow and the initial gas gate station flow; and obtaining a trained first embedding layer, a trained second embedding layer, and a trained first output layer by updating parameters of the initial first embedding layer, the initial second embedding layer, and the initial first output layer;

determining, by the intelligent operation management sub-platform processor, gas gate station pressure of each intelligent gas gate station based the gas gate station flow, gas gate station feature and gas terminal target pressure;

obtaining a pressure sum by aggregating gas gate station pressures of intelligent gas gate stations;

determining the pressure regulation scheme of the each intelligent gas gate station based on the pressure sum and a total pressure threshold, wherein the pressure regulation scheme is a scheme for regulating a gas pressure, the pressure regulation scheme includes an adjustment time and an adjustment range, and the intelligent gas gate station is a receiving station where natural gas enters a city pipe network from a long-distance pipeline and is part of a gas pipe network device; and sending the pressure regulation scheme to the intelligent gas object platform through the intelligent gas sensor network platform, to control a gate station device of a corresponding intelligent gas gate station to adjust the gas pressure according to the adjustment range during the adjustment time.

2. The method for determining the pressure regulation scheme at the intelligent gas gate station based on the Internet of Things of claim 1, further comprising:

transmitting, by the intelligent operation management sub-platform processor, the pressure regulation scheme of the intelligent gas gate station to the intelligent gas data center;

transmitting, by the intelligent gas data center processor, the pressure regulation scheme of the intelligent gas gate station to the intelligent gas service platform; and transmitting, by an intelligent gas service platform processor, the pressure regulation scheme of the intelligent gas gate station to an intelligent gas user platform.

3. The method for determining the pressure regulation scheme at the intelligent gas gate station based on the Internet of Things of claim 1, wherein determining the gas gate station pressure of each intelligent gas gate station based the gas gate station flow, gas gate station feature, and gas terminal target pressure includes:

determining the gas gate station pressure of the each intelligent gas gate station by a pressure model based on the gas gate station feature, the gas terminal target pressure, and the gas gate station flow, wherein the pressure model is a machine learning model; and sending the gas gate station pressure to the intelligent gas object platform through the intelligent gas sensor network platform, to control the gate station device of the corresponding intelligent gas gate station to pre-adjust the gas pressure to the gas gate station pressure.

4. The method for determining the pressure regulation scheme at the intelligent gas gate station based on the Internet of Things of claim 1, wherein the pressure model includes an input layer, a third embedding layer, and a second output layer;

an input of the input layer includes the gas gate station flow and the gas gate station feature, and an output of the input layer includes gate station flow data;

an input of the third embedding layer includes the gas terminal target pressure, and an output of the third embedding layer includes a gas terminal pressure distribution; and an input of the second output layer includes the gate station flow data and the gas terminal pressure distribution, and an output of the second output layer includes the gas gate station pressure.

5. The method for determining the pressure regulation scheme at the intelligent gas gate station based on the Internet of Things of claim 4, wherein the pressure model is obtained by jointly training the input layer, the third embedding layer, and the second output layer based on a plurality of second training samples and second labels, wherein the second training samples include the sample gas gate station flow, sample gas gate station features, sample gas terminal target pressure, and sample distribution feature vector, and the second labels include a sample gas gate station pressure; wherein the jointly training includes:

inputting the sample gas gate station flow and the sample gas gate station features into an initial input layer to obtain an initial gate station flow data output by the initial input layer;

inputting the sample gas terminal target pressure and the sample distribution feature vector into an initial third embedding layer to obtain an initial gas terminal pressure distribution output by the initial third embedding layer;

inputting the gate station flow data and the gas terminal pressure distribution into an initial second output layer to obtain an initial gas gate station pressure output by the initial second output layer;

updating the initial input layer, the initial third embedding layer, and the initial second output layer simultaneously by constructing a loss function based on the sample gas gate station pressure and the initial gas gate station pressure; and obtaining a trained input layer, a trained third embedding layer, and a trained second output layer by updating parameters of the initial input layer, the initial third embedding layer, and the initial second output layer.

6. The method for determining the pressure regulation scheme at the intelligent gas gate station based on the Internet of Things of claim 3, wherein the input of the pressure model further includes the adjusted gas terminal distribution feature.

7. The method for determining the pressure regulation scheme at the intelligent gas gate station based on the Internet of Things of claim 3, wherein the gas gate station feature includes a pressure regulation range of the intelligent gas gate station.

8. The method for determining the pressure regulation scheme at the intelligent gas gate station based on the Internet of Things of claim 3, wherein the flow model and the pressure model are obtained through jointly training based on a plurality of third training samples and third labels, wherein the third training samples include the sample gas terminal flow, the sample gas terminal distribution features, the sample gas gate station features, and the sample gas terminal target pressure, and the third labels include the sample gas gate station pressure;

wherein the jointly training includes:
inputting the sample gas terminal flow and the sample gas terminal distribution feature into an initial flow model to obtain an initial gate station flow data output by the initial flow model;
inputting the initial gate station flow data into an initial pressure model together with the sample gas gate station features and the sample gas terminal target pressure to obtain the initial gas gate station pressure output by the initial pressure model;
updating the initial flow model and the initial pressure model simultaneously by constructing a loss function based on the sample gas gate station pressure and the initial gas gate station pressure output by the initial pressure model; and
obtaining a trained flow model and a trained pressure model by updating parameters of the initial flow model and the initial pressure model.

9. A system for determining a pressure regulation scheme at an intelligent gas gate station based on an Internet of Things, wherein the system comprises an intelligent gas user platform, an intelligent gas service platform, an intelligent gas management platform, an intelligent gas sensor network platform, and an intelligent gas object platform, and the intelligent gas management platform includes an intelligent customer service management sub-platform, an intelligent operation management sub-platform, and an intelligent gas data center, wherein the system further comprises a non-transitory computer-readable storage medium storing executable instructions and at least one processor in communication with the non-transitory computer-readable storage medium, wherein when executing executable instructions, the at least one processor is configured to cause the system to:

obtain gas terminal information and historical usage data from a gas terminal in the intelligent gas object platform through the intelligent gas sensor network platform, wherein the gas terminal information includes gas terminal flow and a gas terminal distribution feature, the gas terminal refers to a terminal that monitors usage data of a gas device, the gas terminal includes a gas meter and a flow meter, the gas device includes industrial gas devices and gas devices for residential use, and the industrial gas devices include industrial gas boilers and gas generators;

determine active status of the gas terminal based on the historical usage data, wherein the active status is an extent to which the gas terminal is used in a past time period corresponding to the historical usage data;

adjust the gas terminal distribution feature based on the active status;

predict a gas gate station flow by analyzing the gas terminal flow and an adjusted gas terminal distribution feature based on a flow model, wherein the flow model is a machine learning model, and the flow model includes a first embedding layer, a second embedding layer, and a first output layer, wherein an output of the first embedding layer and an output of the second embedding layer are input to the first output layer, an input of the first embedding layer includes gas terminal flow at a plurality of time points, and the output of the first embedding layer includes a flow feature vector; an input of the second embedding layer includes the adjusted gas terminal distribution feature, and the output of the second embedding layer includes a distribution feature vector; and an input of the first output layer includes the flow feature vector and the distribution feature vector, and an output of the first output layer includes the gas gate station flow;

wherein the flow model is obtained through jointly training the first embedding layer, the second embedding layer, and the first output layer based on a plurality of first training samples and first labels, wherein the first training samples include sample gas terminal flow and sample gas terminal distribution features, and the first labels include a sample gas gate station flow;

wherein the jointly training includes:
inputting the sample gas terminal flow into an initial first embedding layer to obtain an initial flow feature vector output by the initial first embedding layer;
inputting the sample gas terminal distribution features into an initial second embedding layer to obtain an initial distribution feature vector output by the initial second embedding layer;
inputting the initial flow feature vector and the initial distribution feature vector into an initial first output layer to obtain an initial gas gate station flow output by the initial first output layer;
updating the initial first embedding layer, the initial second embedding layer, and the initial first output layer simultaneously by constructing a loss function based on the sample gas gate station flow and the initial gas gate station flow; and
obtaining a trained first embedding layer, a trained second embedding layer, and a trained first output layer by updating parameters of the initial first embedding layer, the initial second embedding layer, and the initial first output layer;

determine gas gate station pressure of each intelligent gas gate station based the gas gate station flow, gas gate station feature and gas terminal target pressure;

obtain a pressure sum by aggregating gas gate station pressures of intelligent gas gate stations;

determine the pressure regulation scheme of the each intelligent gas gate station based on the pressure sum and a total pressure threshold, wherein the pressure regulation scheme is a scheme for regulating a gas pressure, the pressure regulation scheme includes an adjustment time and an adjustment range, and the intelligent gas gate station is a receiving station where natural gas enters a city pipe network from a long-distance pipeline and is part of a gas pipe network device; and send the pressure regulation scheme to the intelligent gas object platform through the intelligent gas sensor network platform, to control a gate station device of a corresponding intelligent gas gate station to adjust the gas pressure according to the adjustment range during the adjustment time.

10. The system for determining the pressure regulation scheme at the intelligent gas gate station based on the Internet of Things of claim 9, wherein the at least one processor is configured to cause the system to:

transmit the pressure regulation scheme of the intelligent gas gate station to the intelligent gas data center;

transmit the pressure regulation scheme of the intelligent gas gate station to the intelligent gas service platform; and transmit the pressure regulation scheme of the intelligent gas gate station to the intelligent gas user platform.

11. The system for determining the pressure regulation scheme at the intelligent gas gate station based on the Internet of Things of claim 9, wherein the at least one processor is configured to cause the system to:

determine the gas gate station pressure of the each intelligent gas gate station by a pressure model based on the gas gate station feature, the gas terminal target pressure, and the gas gate station flow, wherein the pressure model is a machine learning model; and sending the gas gate station pressure to the intelligent gas object platform through the intelligent gas sensor network platform, to control the gate station device of the corresponding intelligent gas gate station to pre-adjust the gas pressure to the gas gate station pressure.

12. The system for determining the pressure regulation scheme at the intelligent gas gate station based on the Internet of Things of claim 11, wherein the pressure model includes an input layer, a third embedding layer, and a second output layer;

an input of the input layer includes the gas gate station flow and the gas gate station feature, and an output of the input layer includes gate station flow data;

an input of the third embedding layer includes the gas terminal target pressure, and an output of the third embedding layer includes a gas terminal pressure distribution; and an input of the second output layer includes the gate station flow data and the gas terminal pressure distribution, and an output of the second output layer includes the gas gate station pressure.

13. The system for determining the pressure regulation scheme at the intelligent gas gate station based on the Internet of Things of claim 12, wherein the pressure model is obtained by jointly training the input layer, the third embedding layer, and the second output layer based on a plurality of second training samples and second labels, wherein the second training samples include the sample gas gate station flow, sample gas gate station features, sample gas terminal target pressure, and sample distribution feature vector, and the second labels include a sample gas gate station pressure;

wherein the jointly training includes:

inputting the sample gas gate station flow and the sample gas gate station features into an initial input layer to obtain an initial gate station flow data output by the initial input layer;

inputting the sample gas terminal target pressure and the sample distribution feature vector into an initial third embedding layer to obtain an initial gas terminal pressure distribution output by the initial third embedding layer;

inputting the gate station flow data and the gas terminal pressure distribution into an initial second output layer to obtain an initial gas gate station pressure output by the initial second output layer;

updating the initial input layer, the initial third embedding layer, and the initial second output layer simultaneously by constructing a loss function based on the sample gas gate station pressure and the initial gas gate station pressure; and obtaining a trained input layer, a trained third embedding layer, and a trained second output layer by updating parameters of the initial input layer, the initial third embedding layer, and the initial second output layer.

14. The system for determining the pressure regulation scheme at the intelligent gas gate station based on the Internet of Things of claim 11, wherein the input of the pressure model further includes the adjusted gas terminal distribution feature.

15. The system for determining the pressure regulation scheme at the intelligent gas gate station based on the Internet of Things of claim 11, wherein the gas gate station feature includes a pressure regulation range of the intelligent gas gate station.

16. The system for determining the pressure regulation scheme at the intelligent gas gate station based on the Internet of Things of claim 11, wherein the flow model and the pressure model are obtained through jointly training based on a plurality of third training samples and third labels, wherein the third training samples include the sample gas terminal flow, the sample gas terminal distribution features, the sample gas gate station features, and the sample gas terminal target pressure, and the third labels include the sample gas gate station pressure;

wherein the jointly training includes:

inputting the sample gas terminal flow and the sample gas terminal distribution feature into an initial flow model to obtain an initial gate station flow data output by the initial flow model;

inputting the initial gate station flow data into an initial pressure model together with the sample gas gate station features and the sample gas terminal target pressure to obtain the initial gas gate station pressure output by the initial pressure model;

updating the initial flow model and the initial pressure model simultaneously by constructing a loss function based on the sample gas gate station pressure and the initial gas gate station pressure output by the initial pressure model; and obtaining a trained flow model and a trained pressure model by updating parameters of the initial flow model and the initial pressure model.

17. A non-transitory computer-readable storage medium in which a computer instruction is stored, wherein when the computer instruction is executed by a computer, the computer executes a method of determining a pressure regulation scheme at an intelligent gas gate station based on an Internet of Things, the method includes:

obtaining, by an intelligent gas data center processor, gas terminal information and historical usage data from a gas terminal in an intelligent gas object platform through an intelligent gas sensor network platform, wherein the gas terminal information includes gas terminal flow and a gas terminal distribution feature, the gas terminal refers to a terminal that monitors usage data of a gas device, the gas terminal includes a gas meter and a flow meter, the gas device includes industrial gas devices and gas devices for residential use, and the industrial gas devices include industrial gas boilers and gas generators;

determining, by an intelligent operation management sub-platform processor, active status of the gas terminal based on the historical usage data, wherein the active status is an extent to which the gas terminal is used in a past time period corresponding to the historical usage data;

adjusting, by the intelligent operation management sub-platform processor, the gas terminal distribution feature based on the active status;

predicting, by the intelligent operation management sub-platform processor, a gas gate station flow by analyzing the gas terminal flow and an adjusted gas terminal distribution feature based on a flow model, wherein the flow model is a machine learning model, and the flow model includes a first embedding layer, a second embedding layer, and a first output layer, wherein an output of the first embedding layer and an output of the second embedding layer are input to the first output layer, an input of the first embedding layer includes gas terminal flow at a plurality of time points, and the output of the first embedding layer includes a flow feature vector; an input of the second embedding layer includes the adjusted gas terminal distribution feature, and the output of the second embedding layer includes a distribution feature vector; and an input of the first output layer includes the flow feature vector and the distribution feature vector, and an output of the first output layer includes the gas gate station flow;

wherein the flow model is obtained through jointly training the first embedding layer, the second embedding layer, and the first output layer based on a plurality of first training samples and first labels, wherein the first training samples include sample gas terminal flow and sample gas terminal distribution features, and the first labels include a sample gas gate station flow;

wherein the jointly training includes:

inputting the sample gas terminal flow into an initial first embedding layer to obtain an initial flow feature vector output by the initial first embedding layer;

inputting the sample gas terminal distribution features into an initial second embedding layer to obtain an initial distribution feature vector output by the initial second embedding layer;

inputting the initial flow feature vector and the initial distribution feature vector into an initial first output layer to obtain an initial gas gate station flow output by the initial first output layer;

updating the initial first embedding layer, the initial second embedding layer, and the initial first output layer simultaneously by constructing a loss function based on the sample gas gate station flow and the initial gas gate station flow; and obtaining a trained first embedding layer, a trained second embedding layer, and a trained first output layer by updating parameters of the initial first embedding layer, the initial second embedding layer, and the initial first output layer;

determining, by the intelligent operation management sub-platform processor, gas gate station pressure of each intelligent gas gate station based the gas gate station flow, gas gate station feature and gas terminal target pressure, obtaining a pressure sum by aggregating gas gate station pressures of intelligent gas gate stations, determining the pressure regulation scheme of the each intelligent gas gate station based on the pressure sum and a total pressure threshold, wherein the pressure regulation scheme is a scheme for regulating a gas pressure, the pressure regulation scheme includes an adjustment time and an adjustment range, and the intelligent gas gate station is a receiving station where natural gas enters a city pipe network from a long-distance pipeline and is part of a gas pipe network device; and sending the pressure regulation scheme to the intelligent gas object platform through the intelligent gas sensor network platform, to control a gate station device of a corresponding intelligent gas gate station to adjust the gas pressure according to the adjustment range during the adjustment time.

* * * * *